United States Patent
Torab Jahromi et al.

(12) 
(10) Patent No.: US 10,148,580 B2
(45) Date of Patent: Dec. 4, 2018

(54) LOW-LATENCY PACKET FORWARDING

(71) Applicant: AVAGO TECHNOLOGIES GENERAL IP (SINGAPORE) PTE. LTD., Singapore (SG)

(72) Inventors: Payam Torab Jahromi, Laguna Niguel, CA (US); Alireza Tarighat Mehrabani, Irvine, CA (US); Brima Babatunde Ibrahim, Laguna Hills, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 143 days.

(21) Appl. No.: 14/986,378

(22) Filed: Dec. 31, 2015

(65) Prior Publication Data

US 2016/0316418 A1 Oct. 27, 2016

Related U.S. Application Data

(60) Provisional application No. 62/387,261, filed on Dec. 23, 2015, provisional application No. 62/152,759, filed on Apr. 24, 2015.

(51) Int. Cl.
*H04L 12/801* (2013.01)
*H04W 40/06* (2009.01)
(Continued)

(52) U.S. Cl.
CPC ............ *H04L 47/17* (2013.01); *H04L 1/0083* (2013.01); *H04L 45/566* (2013.01); *H04W 40/06* (2013.01);
(Continued)

(58) Field of Classification Search
None
See application file for complete search history.

(56) References Cited

U.S. PATENT DOCUMENTS

| | | | |
|---|---|---|---|
| 6,414,956 B1 * | 7/2002 | Szczepanek | H04L 1/0061 370/392 |
| 2007/0201390 A1 * | 8/2007 | Kim | H04W 4/18 370/310.2 |

(Continued)

OTHER PUBLICATIONS

Friebe, "MPLS—Part 10," Jun. 2010, retrieved from http://blog.globalknowledge.com/technology/cisco/routing-switching/mpls-%E2%80%93-part-10/.

(Continued)

*Primary Examiner* — Mohammad S Adhami
(74) *Attorney, Agent, or Firm* — Morgan, Lewis & Bockius LLP

(57) ABSTRACT

A device implementing low latency packet forwarding may include at least one processor circuit. The at least one processor circuit may be configured to receive a packet, retrieve routing information from the packet prior to performing an integrity check on the packet, and prepare to transmit the packet based at least in part on the routing information. The routing information may be in the form of, for example, a tag, a label, or a segment, and the routing information may be retrieved from at least one of a preamble, a PHY header, or a MAC header. In the case of the preamble, the information retrieved may be used to both perform channel estimation and route the packet. In multiple-input and multiple-output (MIMO) and/or channel aggregation implementations, at least a portion of the preamble of each stream (or channel) can be combined to form the routing information.

20 Claims, 7 Drawing Sheets

(51) Int. Cl.
    *H04L 12/721*     (2013.01)
    *H04L 1/00*     (2006.01)
    *H04L 29/06*     (2006.01)
    *H04B 7/0413*     (2017.01)
    *H04L 5/00*     (2006.01)
    *H04L 12/709*     (2013.01)

(52) U.S. Cl.
    CPC .......... *H04B 7/0413* (2013.01); *H04L 1/0061* (2013.01); *H04L 5/0048* (2013.01); *H04L 45/245* (2013.01); *H04L 69/22* (2013.01)

(56) References Cited

U.S. PATENT DOCUMENTS

| | | | |
|---|---|---|---|
| 2011/0182245 A1* | 7/2011 | Malkamaki | H04L 1/1812 370/329 |
| 2013/0115988 A1* | 5/2013 | Sun | H04J 11/0056 455/501 |
| 2013/0117856 A1* | 5/2013 | Branscomb | H04L 63/0428 726/26 |
| 2014/0146722 A1* | 5/2014 | Azizi | H04L 69/22 370/311 |
| 2014/0254428 A1* | 9/2014 | Visser | H04L 45/123 370/254 |
| 2015/0117282 A1* | 4/2015 | Morgan | H04W 40/005 370/311 |
| 2015/0222533 A1* | 8/2015 | Birrittella | H04L 45/66 370/392 |
| 2016/0128057 A1* | 5/2016 | Seok | H04L 5/0055 370/329 |
| 2017/0099119 A1* | 4/2017 | Rison | H04L 1/0061 |
| 2017/0171886 A1* | 6/2017 | Nabetani | H04W 74/08 |

OTHER PUBLICATIONS

Filsfils, et al., "segment Routing," Nov. 2013 Powerpoint presentation at IETF-88 Vancouver, 18 pages.

\* cited by examiner

LOW-LATENCY PACKET FORWARDING

CROSS-REFERENCES TO RELATED APPLICATIONS

This application claims the benefit of U.S. Provisional Patent Application No. 62/387,261, entitled "Low-Latency Packet Forwarding," filed on Dec. 23, 2015, and U.S. Provisional Patent Application No. 62/152,759, entitled "Scalable and Modular RF Solution for High Performance mmWave Communications," filed Apr. 24, 2015, both of which are hereby incorporated by reference in their entirety for all purposes.

TECHNICAL FIELD

The present description relates generally to packet forwarding, including low latency packet forwarding using label, segment, and/or IPv6 tag switching.

BACKGROUND

The transmission latency through multi-hop wireless networks (e.g., metropolitan backhaul networks) may be reduced through low-latency packet forwarding at each hop. Source routing and conventional label switching utilize full packet inspection, and may also utilize an integrity check (e.g. CRC) which subjects the packet forwarding to delays potentially as large as the packet airtime duration.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
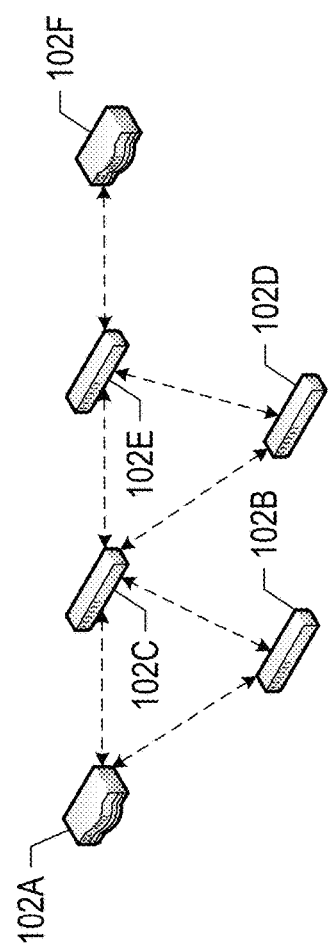
FIG. 1 illustrates an example network environment in which low-latency packet forwarding may be implemented in accordance with one or more implementations.

FIG. 1 illustrates an example network environment 100 in which low-latency packet forwarding may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network environment 100 includes one or more electronic devices 102A-F that may also be referred to as nodes, or network nodes. For explanatory purposes, the network environment 100 is illustrated as a mesh network; however, the subject system is not limited to a mesh network topology. The electronic devices 102A-F may be, for example, network devices, such as switch devices, routing devices, bridge devices, and the like. The electronic devices 102A,F may be referred to as edge (or endpoint) devices, and may each be coupled to one or more additional devices or networks (not shown) that are external to the network environment 100. The electronic devices 102B-E may be referred to as intermediate or intermediary devices. One or more of the electronic devices 102A-F may be and/or include all or part of the electronic system discussed further below with respect to FIG. 7.

When data traffic is routed through the network environment 100 from the electronic device 102A to the electronic device 102F, the electronic device 102A may be referred to as an ingress device and the electronic device 102F may be referred to as an egress device. Conversely, when data traffic is being routed through the network environment 100 from the electronic device 102F to the electronic device 102A, the electronic device 102F may be referred to as an ingress device and the electronic device 102A may be referred to as an egress device.

The electronic devices 102A-F may each include one or more ports (or interfaces) that may be referred to as ingress ports (or interfaces) when the electronic devices 102A-F are receiving data packets over the ports (or interfaces) and may be referred to as egress ports (or interfaces) when data packets are being transmitted over the ports (or interfaces). The interfaces may include, for example, different networking technologies that the electronic devices 102A-F may utilize to communicate with each other, such as WiFi, Bluetooth, Zigbee, mmWave, Multimedia over Coax Alliance (MoCA), or generally any networking technology.

In one or more implementations, the electronic devices 102A-F may implement label, tag, and/or IPv6 segment-based packet routing. In this manner, the electronic devices 102A-F may embed routing information, such as labels and/or tags, in transmitted packets to indicate the appropriate switching for the packets at each hop and/or at the next hop. The electronic devices 102A-F may each store one or more forwarding rules that indicate the appropriate forwarding of a received packet, e.g. based on the routing information embedded in the packet and/or the ingress port over which the packet was received. Thus, using label switching in the network environment 100, data packets transmitted from the electronic device 102A to the electronic device 102F, may be routed via one of four different switching paths: (1) 102A-C-E-F; (2) 102A-B-C-E-F; (3) 102A-C-D-E-F; or (4) 102A-B-C-D-E-F. Example switching paths and data forwarding rules are discussed further below with respect to FIG. 2.

In the subject low-latency packet forwarding system, the electronic devices 102A-F embed at least the outermost labels, in a portion of the packets that are not subject to an integrity check, such as the MAC header (e.g. for 802.11), the PHY header, or the preamble of the packet. In this manner, the electronic devices 102A-F can receive and label switch the packets without having to perform a full packet inspection and/or without having to perform an integrity check on the received packets. Thus, the electronic devices 102A-F can perform cut-through switching without inspecting the packet and/or the electronic devices 102A-F can prepare the transmit path in advance of forwarding the packet, e.g. while the packet is being inspected and/or while an integrity check is being performed on the packet. Furthermore, since the electronic devices 102A-F can retrieve the routing information from the beginning of the packet, as the packet is received, the electronic devices 102A-F may immediately begin forwarding or routing the received packet based on the routing information, e.g. before the entire packet (including the frame check sequence) has been received.

With respect to embedding labels in the MAC header, one or more of the electronic devices 102A-F may copy at least the outermost labels from a second portion of the packet, such as a multiprotocol label switching (MPLS) header or shim, into the MAC header such that the system maintains compatibility with legacy electronic devices. For example, one or more of the electronic devices 102A-F may not support the subject system and therefore may retrieve the labels from the MPLS header rather than the MAC header. With respect to embedding labels in the PHY header, one or more of the electronic devices 102A-F may embed at least one label (starting from the outermost label) in the PHY header. In one or more implementations, the length of the MAC and/or PHY headers may be variable such that additional labels may be placed in the MAC and/or PHY header.

With respect to embedding labels in the preamble, one or more of the electronic devices 102A-F may use different short training field (STF) sequences and/or different channel estimation field (CEF) sequences, e.g. different Golay sequences, as labels. Thus, the short training and/or the channel estimation fields may be used by the electronic devices 102A-F to both perform signal acquisition/channel estimation and switch received packets. For explanatory purposes, the subject system is generally discussed herein in the context of label switching; however, the subject system is applicable to any routing information carried in packets, such as tags, IPv6 segments, etc. An example process for embedding or inserting routing information into packets is discussed further below with respect to FIG. 4, and an example process of retrieving routing information from, and switching, a received packet is discussed further below with respect to FIG. 5.

Embedding labels in the preamble is also applicable to multiple-input and multiple-output (MIMO) implementations and/or channel aggregation/bonding implementations that include multiple streams (in adjacent and/or non-adjacent channels). However, in the instance of multiple streams, the electronic devices 102A-F may embed a portion of the routing information in each transmitted stream, and/or information carried in each transmitted stream may be combined to form the routing information. Thus, in the instance of embedding routing information in the preambles, the STF and/or CEF sequences of each stream (that have low cross-correlation) can be combined to form the routing information, e.g. labels, for forwarding/routing the packets. Thus, the streams can individually carry a portion of the routing information that is shorter than the single routing information carried in a single stream implementation, which may facilitate embedding routing information in shorter fields. Embedding routing information in the preamble for MIMO and/or channel aggregation implementations are discussed further below with respect to FIG. 3.

Figure 2:
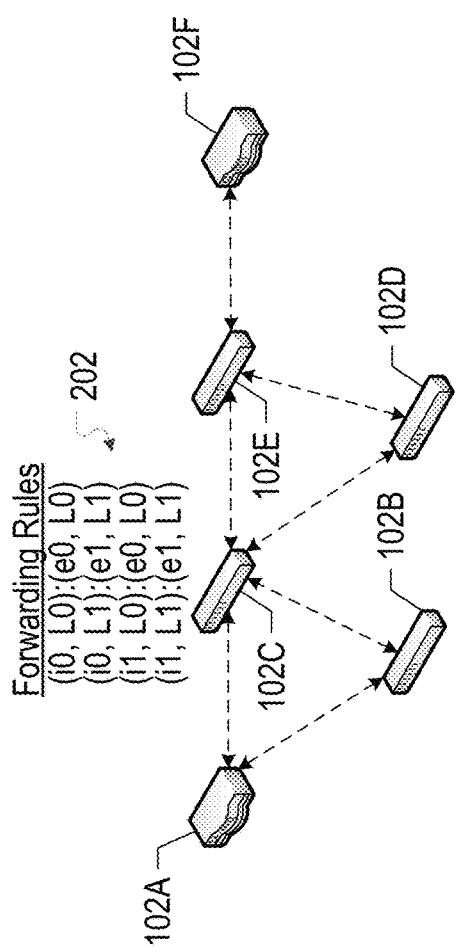
FIG. 2 illustrates an example network environment in which low-latency packet forwarding may be implemented in accordance with one or more implementations.

FIG. 2 illustrates an example network environment 200 in which low-latency packet forwarding may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network environment 200 includes the electronic devices 102A-F and illustrates a forwarding rules table 202 that is stored at the electronic device 102C. As discussed above, using label switching in the network environment 100, data packets transmitted from the electronic device 102A to the electronic device 102F, may be routed via one of four different switching paths: (1) 102A-C-E-F; (2) 102A-B-C-E-F; (3) 102A-C-D-E-F; or (4) 102A-B-C-D-E-F. Thus, the electronic device 102C stores four forwarding rules, e.g. in a routing table, that indicates the appropriate label switching to be performed on received packets.

The first forwarding rule indicates that packets received over ingress port 0 (or interface 0) that have label 0 should be transmitted over egress port 0 (or interface 0) with label 0. The second forwarding rule indicates that packets received over ingress port 0 with label 1 should be transmitted over egress label 1 with label 1. The third forwarding rule indicates that packets received over ingress label 1 with label 0 should be transmitted over egress port 0 with label 0. The fourth forwarding rule indicates that packets received over ingress label 1 with label 1 should be transmitted out of egress label 1 with label 1. The other electronic devices 102A,B,D-F may also store routing tables with the appropriate forwarding rules such that the electronic devices 102A,B,D-F can route/forward received packets based at least in part on the labels embedded in the received packets and/or the ingress port over which the packets were received.

Figure 3:
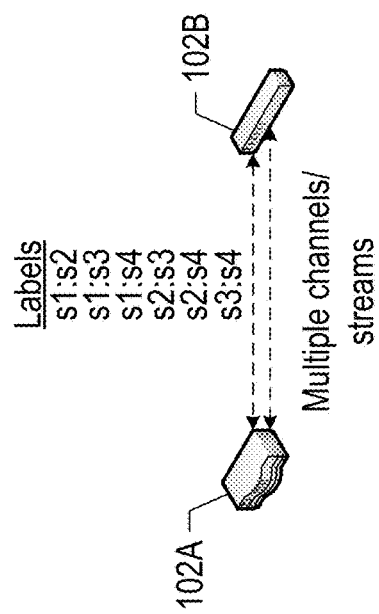
FIG. 3 illustrates an example network environment utilizing multiple channels and/or streams in which low-latency packet forwarding may be implemented in accordance with one or more implementations.

FIG. 3 illustrates an example network environment 300 utilizing multiple channels and/or streams in which low-latency packet forwarding may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network environment 300 includes the electronic device 102A and the electronic device 102B. The electronic devices 102A-B may each be coupled to one or more additional devices and/or networks (not shown). In the network environment 300, the electronic devices 102A-B utilize multiple streams to communicate with one another.

For explanatory purposes, two streams are illustrated in FIG. 3; however, the electronic devices 102A-B may utilize any number of streams. The electronic devices 102A-B may utilize multiple streams for one or more types of transmissions, such as MIMO transmissions, channel aggregation transmissions, channel bonding transmissions, and the like. In this instance of channel aggregation transmissions and/or channel bonding transmissions, the channels carrying the streams may be adjacent and/or non-adjacent channels.

As discussed above, when the electronic devices 102A-B utilize multiple streams, information retrieved from each of the streams may be combined to form the routing information, e.g. label, for the transmission. In this manner, each of the streams only needs to carry a portion of the routing information that would need to be carried by a single stream, e.g. half of the routing information for two streams, a third for three streams, etc. Furthermore, by combining portions of routing information carried by each of the streams, a larger set of different routing information items, e.g. labels, can be formed.

For example, if the preamble of each of the streams in the network environment 300 carries a distinct sequence, such as a distinct Golay sequence with good cross-correlation, then from a set of four such sequences, six different routing information items, such as labels, tags, and/or segments, can be formed by various combinations of the four sequences. For example, the sequences s1, s2, s3, and s4, can be combined to form s1:s2, s1:s3, s1:s4, s2:s3, s2:s4, and s3:s4, where the first sequence in each combination corresponds to the first stream and the second sequence in each combination corresponds to the second stream. In one or more implementations, the combinations of the sequences may be order specific such that the electronic device 102B can distinguish between the received streams. Thus, in this instance, the electronic devices 102A-B may not use a combination of sequences such as s2:s1 as the electronic device 102B may be unable to distinguish this combination from s1:s2.

Thus, as the number of streams and/or channels increases, the number of different routing information items that can be formed by combining the sequences of each channel and/or stream may also increase.

Figure 4:
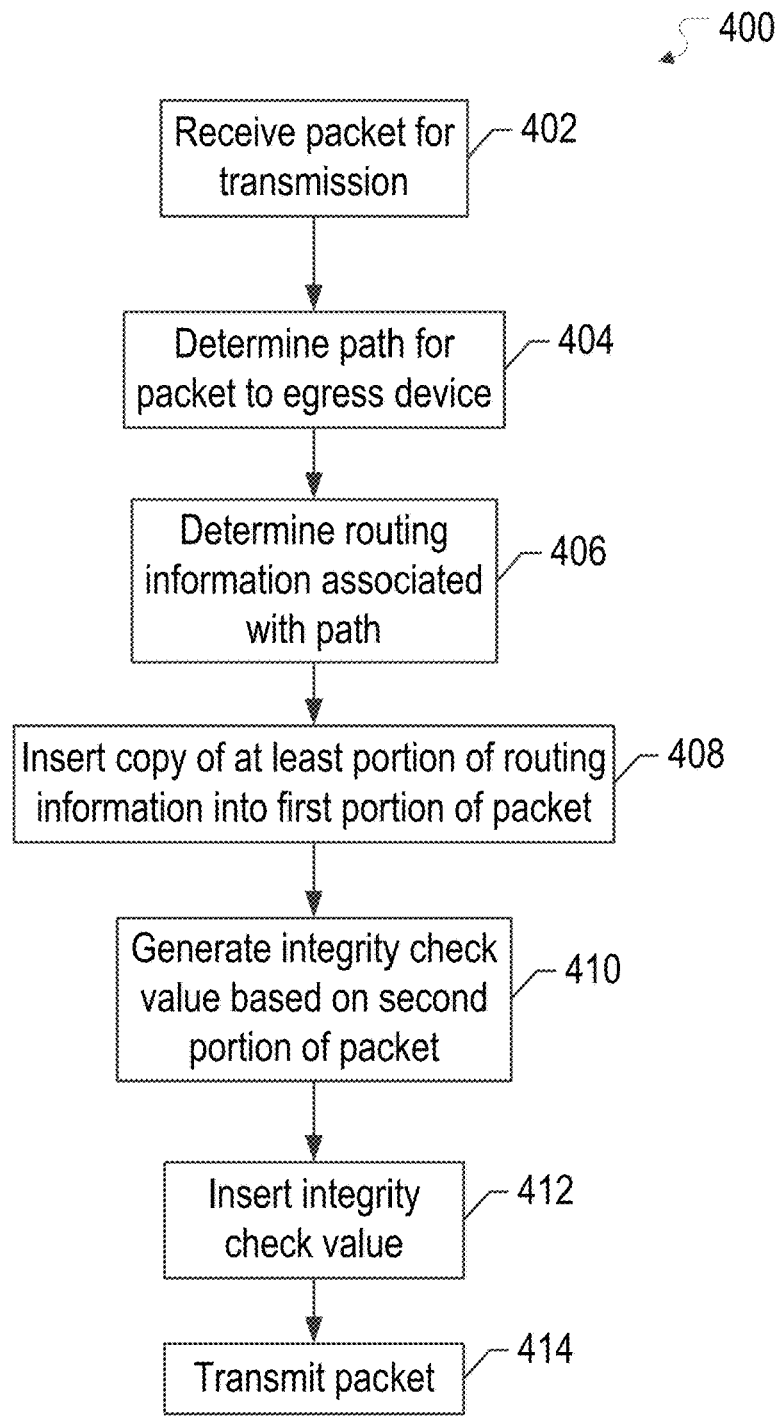
FIG. 4 illustrates a flow diagram of an example process of inserting and/or embedding routing information in a packet in a low-latency packet forwarding system in accordance with one or more implementations.

FIG. 4 illustrates a flow diagram of an example process 400 of inserting routing information into a packet in a low-latency packet forwarding system in accordance with one or more implementations. For explanatory purposes, the example process 400 is described herein with reference to the network environments 100, 200 of FIGS. 1 and 2; however, the example process 400 is not limited to the network environments 100, 200 of FIGS. 1 and 2. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

The electronic device 102A receives a packet for transmission (402). For example, the electronic device 102A may receive a packet from a device and/or network that is communicably coupled to the electronic device 102A, and/or the packet may be generated locally at the electronic device 102A. The electronic device 102A determines a path for the packet to reach the egress device, such as the electronic device 102F (404). In one or more implementations, the path may be predetermined for each packet type, each packet flow, each priority of packets, etc., such as by the network operator, and/or the electronic device 102A may dynamically determine the path, such as based on traffic loading at each of the hops along each of the paths.

The electronic device 102A determines the routing information, such as a label, tag, or segment, associated with the path, such as by retrieving the routing information from a table (406). For example, routing information may be pre-assigned to each of the paths and pre-stored in tables at each of the electronic devices 102A-F. The electronic device 102A inserts or embeds a copy of at least a portion of the routing information, such as the outermost portion, into a first portion of the packet, such as a portion of the packet that is not subject to an integrity check for the packet (408). For example, the electronic device 102A may insert the copy of the at least the portion of the routing information into the preamble, the MAC header, and/or the PHY header, as is discussed further below with respect to FIG. 6. The routing information may also be inserted into a second portion of the packet that is subject to an integrity check, such as an MPLS header, shim, etc.

The electronic device 102A then generates the integrity check value based on the second portion of the packet, such as a cyclic redundancy check (CRC) value (410), inserts the integrity check value into the packet (412), and transmits the packet (414), such as to the next hop. Thus, in this manner the first portion of the packet that is not subject to the integrity check includes a copy of at least a portion of the label such that the packet can be routed/forwarded by supporting devices without performing an integrity check and/or without a deep packet inspection. However, the second portion of the packet, which is subject to the integrity check, may also include a copy of the label such that devices that do not support the subject system can still route and forward the packets in the usual manner.

Figure 5:
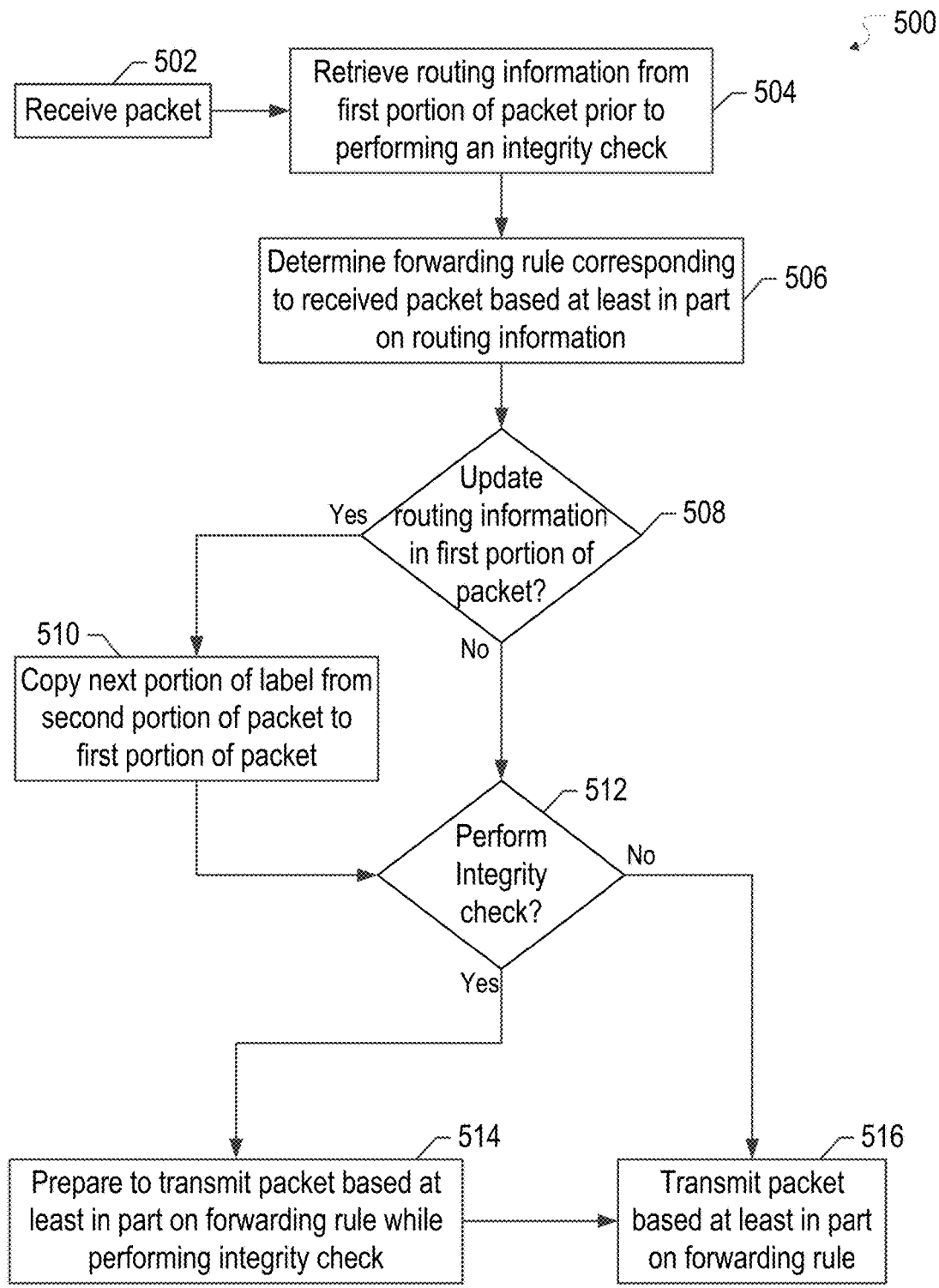
FIG. 5 illustrates a flow diagram of an example process of retrieving routing information from a packet in a low-latency packet forwarding system in accordance with one or more implementations.

FIG. 5 illustrates a flow diagram of an example process of retrieving routing information from a packet in a low-latency packet forwarding system in accordance with one or more implementations. For explanatory purposes, the example process 500 is described herein with reference to the network environments 100, 200 of FIGS. 1 and 2; however, the example process 500 is not limited to the network environments 100, 200 of FIGS. 1 and 2. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

One of the electronic devices 102A-F, such as the electronic device 102C, receives a packet over an ingress port (502). The electronic device 102C retrieves routing information from a first portion of the packet prior to performing an integrity check on the packet, and as the packet is being received (504). The routing information may be, for example, one or more labels, tags, and/or segments, and the first portion of the packet may include, for example, the preamble, MAC header, and/or PHY header, as is discussed further below with respect to FIG. 6.

The electronic device 102C determines a forwarding rule corresponding to the received packet based at least in part on the retrieved routing information and/or the ingress port over which the packet was received (506). For example, the electronic device 102C may retrieve the forwarding rule from the forwarding rules table 202. The electronic device 102C determines whether to update the at least the portion of the routing information stored in the first portion of the packet (508). For example, if the routing information includes a number of stacked labels, only the outermost labels may be stored in the first portion of the packet. Thus, once the outermost labels in the first portion of the packet have been utilized and are no longer relevant to the remaining path, the labels in the first portion of the packet are replaced with the next portion of the labels that will be utilized for the remaining portion of the path.

If the electronic device 102C determines that the at least the portion of the routing information stored in the first portion of the packet should be updated (508), the electronic device 102C copies the next portion of the routing information from the second portion of the packet, e.g. the MPLS header, to the first portion of the packet, e.g. the preamble, PHY header, and/or MAC header, thereby replacing the routing information previously stored in the first portion of the packet (510). The electronic device 102C then determines whether to perform an integrity check on the received packet (512). Likewise, when the electronic device 102C determines that the routing information does not need to be updated in the first portion of the packet (508), the electronic device 102C determines whether to perform an integrity check on the received packet (512).

Since the routing information is stored in the first portion of the packet that is not subject to the integrity check, the electronic device 102C can start forwarding the received packet without performing the integrity check, e.g. prior to receiving the entirety of the packet including the frame check sequence that is utilized for the integrity check. For high quality links with minimal packet loss, the integrity check may be unnecessary. However, to ensure the integrity of the packet throughout the network path, in one or more implementations the subject system may include a mechanism for periodically performing the integrity check, such as at every other hop, or at any number of hops.

In one or more implementations, the hops where the integrity checks are performed may be preconfigured. Alternatively, or in addition, the first portion of the packet may include a bit (or n number of bits) that indicate whether an integrity check was performed at the last hop and/or how many hops the packet has passed through since the last integrity check was performed. Thus, the electronic devices 102A-F may set a bit to indicate whether an integrity check was performed and/or may increment a counter when an integrity check has not been performed. In this manner, an integrity check can be performed when the number hops since the last integrity check exceeds a threshold.

If the electronic device 102C determines that an integrity check should be performed (512), the electronic device 102C prepares to transmit the packet based at least in part on the forwarding rule while performing the integrity check and/or while waiting for the integrity check to be performed (514). In this manner, the transmit path circuitry can be preconfigured to transmit the packet as soon as the integrity check is completed, assuming the packet passes the integrity check, thereby minimizing latency. The electronic device 102C then transmits the packet to the next hop, as indicated by the forwarding rule, after the integrity check has been completed (516).

If the electronic device 102C determines that the integrity check does not need to be performed (512), the electronic device 102C can immediately begin forwarding/routing the packet based at least in part on the forwarding rule (516). In this manner, the electronic device 102C can begin forwarding the packet as soon as the first portion of the packet is received, e.g. prior to receiving the second portion of the packet, thereby minimizing latency.

Figure 6:
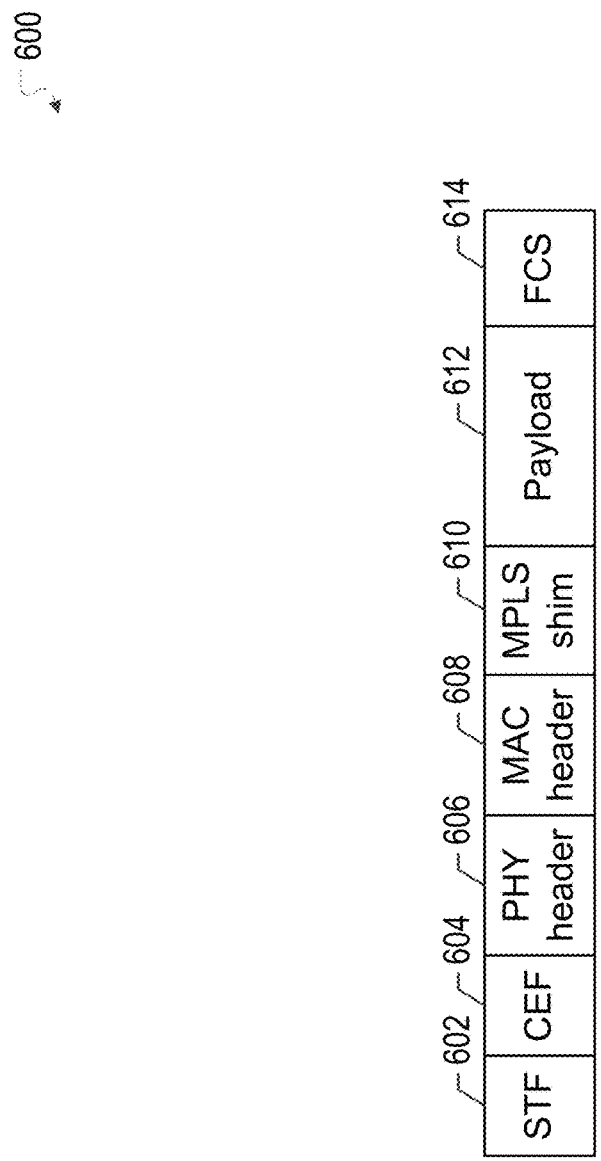
FIG. 6 illustrates an example packet in accordance with one or more implementations.

FIG. 6 illustrates an example packet 600 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The packet 600 includes a short training field (STF) 602, a channel estimation field (CEF) 604, a PHY header 606, a MAC header 608, a MPLS shim 610, a payload 612, and a frame check sequence (FCS) 614. In one or more implementations, the MPLS shim 610 may not be included and/or may be replaced by an MPLS header (not shown) and/or other field.

The STF 602 and the CEF 604 may be collectively referred to as the preamble for the packet 600. The preamble may be used to perform signal acquisition and/or channel estimation. The first portion of the packet, as used herein, may refer to one or more of the STF 602, the CEF 604, the PHY header 606, and/or the MAC header 608. The second portion of the packet, as used herein, may refer to one or more of the MPLS shim 610, the payload 612, and the FCS 614.

Thus, in the subject system, routing information, such as labels, tags, and/or segments, may be inserted and/or embedded into the STF 602, the CEF 604, the PHY header 606, and/or the MAC header 608. One or more of these fields may be variable length and/or may be fixed length. In the case of variable length fields, the length of the fields may be increased to accommodate inserting the routing information. However, in the case of fixed length fields, the routing information may be inserted into unused space in the fields, and/or one or more portions of the fields may be repurposed and/or re-used to carry the routing information.

For example, in the instance of the preamble, the values used for the STF 602 and/or the CEF 604 for signal acquisition and/or channel estimation, such as Golay sequences, may also be used as routing information. In this manner, each path through the network may be associated with a different Golay sequence and the electronic devices 102A-F, after using the Golay sequence of a received packet for signal acquisition and/or channel estimation, may re-use the received Golay sequence to determine the appropriate routing/forwarding of the packet. Similarly, one or more fields of the PHY header 606 and/or the MAC header 608 may be repurposed and/or reused to carry routing information for the packet.

Figure 7:
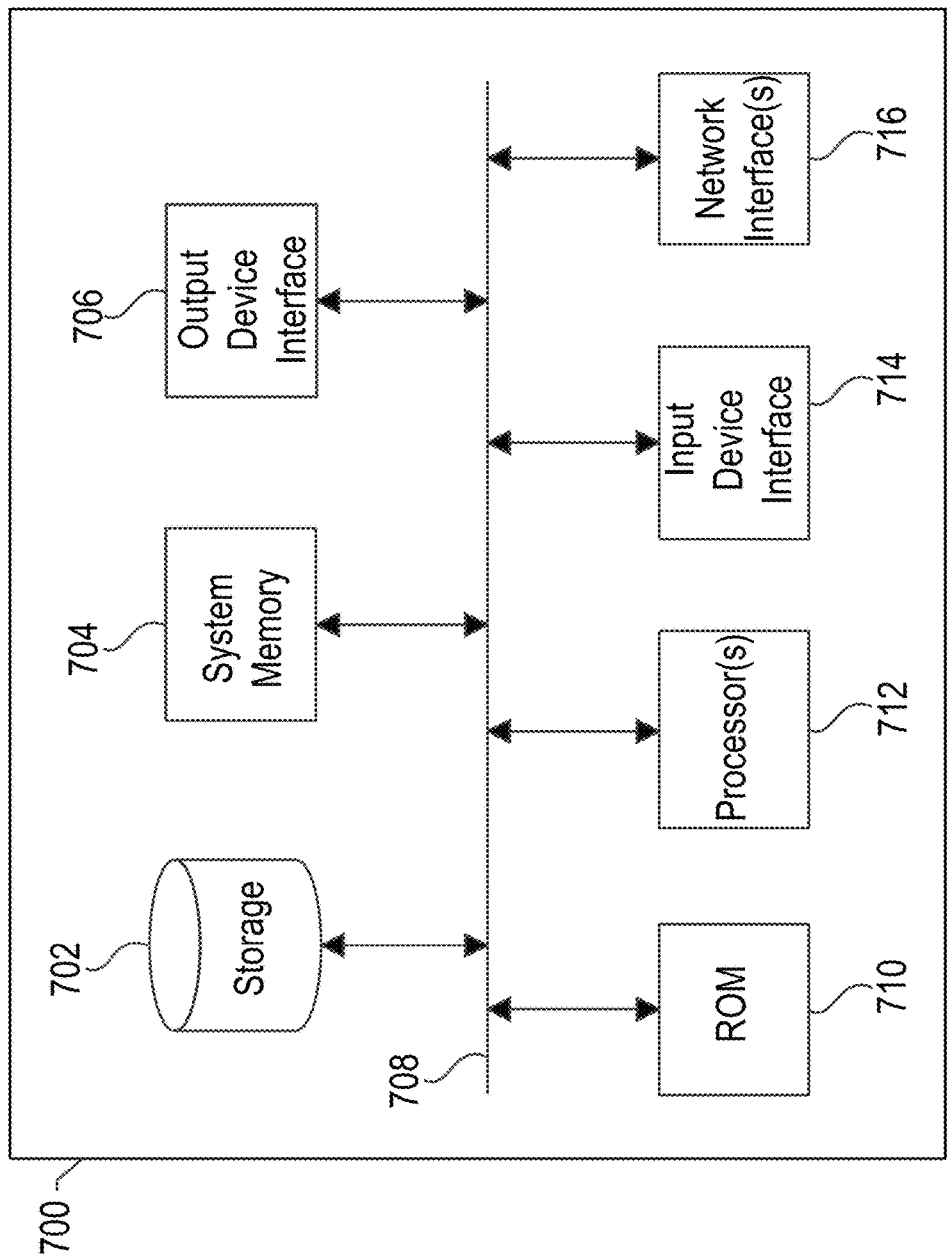
FIG. 7 conceptually illustrates an electronic system with which one or more implementations of the subject technology may be implemented.

FIG. 7 conceptually illustrates an electronic system 700 with which one or more implementations of the subject technology may be implemented. The electronic system 700, for example, may be, or may be coupled to, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 700 can be, and/or can be a part of, one or more of the electronic devices 102A-F. Such an electronic system includes various types of computer readable media and interfaces for various other types of computer readable media. The electronic system 700 includes a bus 708, one or more processor(s) 712, a system memory 704 or buffer, a read-only memory (ROM) 710, a permanent storage device 702, an input device interface 714, an output device interface 706, and one or more network interface(s) 716, or subsets and variations thereof.

The bus 708 collectively represents all system, peripheral, and chipset buses that communicatively connect the numerous internal devices of the electronic system 700. In one or more implementations, the bus 708 communicatively connects the one or more processor(s) 712 with the ROM 710, the system memory 704, and the permanent storage device 702. From these various memory units, the one or more processor(s) 712 retrieve instructions to execute and data to process in order to execute the processes of the subject disclosure. The one or more processor(s) 712 can be a single processor or a multi-core processor in different implementations.

The ROM 710 stores static data and instructions that are needed by the one or more processor(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processor(s) 712 may need at runtime. In one or more implementations, the processes of the subject disclosure are stored in the system memory 704, the permanent storage device 702, and/or the ROM 710. From these various memory units, the one or more processor(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, the bus 708 also couples the electronic system 700 to one or more networks (not shown) through one or more network interface(s) 716. One or more network interface(s) may include an Ethernet interface, a WiFi interface, a cellular interface, a mmWave interface, a reduced gigabit media independent interface (RGMII), or generally any interface for connecting to a network. The one or more network interfaces 716 may include, or may be coupled to, a physical layer module. In this manner, the electronic system 700 can be a part of one or more networks of computers (such as a local area network ("LAN"), a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   a memory; and
   at least one processor circuit configured to:
   receive a packet;
   retrieve routing information from at least one of a channel estimation field or a short training field of the packet prior to performing an integrity check on the packet, the routing information being excluded from an integrity check value used for the integrity check, wherein the routing information comprises at least one of a label, a tag, or a segment; and
   prepare to transmit the packet based at least in part on the routing information.

2. The device of claim 1, wherein the routing information is retrieved from the short training field.

3. The device of claim 1, wherein the routing information is retrieved from the channel estimation field.

4. The device of claim 3, wherein the routing information comprises a Golay sequence of the channel estimation field.

5. The device of claim 3, wherein the at least one processor circuit is further configured to:
   perform channel estimation based at least in part on the routing information retrieved from the channel estimation field.

6. The device of claim 1, wherein the routing information comprises the label.

7. The device of claim 1, wherein preparing to transmit the packet comprises preparing a transmit path for transmitting the packet.

8. The device of claim 1, wherein the at least one processor circuit is further configured to:
   transmit the packet without performing the integrity check on the packet.

9. The device of claim 1, wherein a copy of the routing information may be included in a portion of the packet that is subject to the integrity check.

10. The device of claim 9, wherein the at least one processor circuit is further configured to:
    perform the integrity check on the portion of the packet that is subject to the integrity check.

11. The device of claim 1, wherein the at least one processor circuit is further configured to:
    replace the routing information in a first portion of the packet with next hop routing information retrieved from a second portion of the packet.

12. A method comprising:
    receiving a packet for transmission;
    determining routing information corresponding to a path for the packet to reach an endpoint device, wherein the routing information comprises at least one of a label, a tag, or a segment;
    inserting the routing information into a first portion of the packet, the first portion of the packet comprising at least one of a channel estimation field or a short training field;
    generating an integrity check value for a second portion of the packet that is distinct from the first portion of the packet;
    inserting the integrity check value into the packet; and
    transmitting the packet.

13. The method of claim 12, wherein the routing information is inserted into the channel estimation field.

14. The method of claim 12, wherein the routing information comprises the tag.

15. The method of claim 12, further comprising:
    inserting a copy of the routing information into the second portion of the packet prior to generating the integrity check value.

16. The method of claim 12, wherein the transmission comprises at least one of a multiple input multiple output (MIMO) transmission comprising at least a first stream and a second stream, or a channel aggregation transmission comprising at least the first stream and the second stream.

17. The method of claim 16, wherein the routing information is split between the first stream and the second stream.

18. A computer program product comprising a non-transitory computer-readable storage medium having instructions stored therein, the instructions comprising:
    instructions to receive a packet;
    instructions to retrieve routing information from a field of the packet used to perform channel estimation, wherein the field comprises at least one of a channel estimation field or a short training field; and
    instructions to route the packet based at least in part on the routing information, wherein the routing information comprises at least one of a label, a tag, or a segment.

19. The computer program product of claim 18, wherein the field comprises the channel estimation field and the routing information comprises the segment.

20. The computer program product of claim 19, wherein the instructions to route the packet based at least in part on the routing information further comprise instructions to route the packet based at least in part on the routing information without performing an integrity check on the packet.

\* \* \* \* \*